May 23, 1939.  V. W. LEUSCH ET AL  2,159,591
FISHING LURE
Filed July 11, 1936

V. WILLIAM LEUSCH.
HEYWARD P. GIBSON,
INVENTORS.

BY *Ottoch & Knoblock*

ATTORNEYS.

Patented May 23, 1939

2,159,591

UNITED STATES PATENT OFFICE 2,159,591

FISHING LURE

Victor William Leusch and Heyward P. Gibson, South Bend, Ind., assignors to South Bend Bait Company, South Bend, Ind., a corporation of Indiana Application July 11, 1936, Serial No. 90,080

9 Claims. (Cl. 43—46)

This invention relates to improvements in fishing lures, and particularly to artificial fish baits of the floating plug type which are adapted for erratic diving and darting movement when drawn through the water.

The primary object of the invention is to provide a fish lure of this character with line attaching means at each of its ends and so constructed that the lure will have two distinct and different characteristic movements when drawn through the water, dependent upon the end thereof to which the line is attached, whereby a single lure will serve for either of two different types and conditions of fishing.

A further object is to provide a lure of this character having a body provided with an inclined cylindrical groove formed in one end thereof and a longitudinally downwardly inclined plate at its other end which serves as a diving plate when a line is attached to the lure adjacent thereto and which expedites and quickens diving action of the lure when a line is attached to the lure at the grooved end.

A further object is to provide a lure of this character with a longitudinal inclined face at one end, and a substantially V-shaped configuration at the other end to which a V-shaped plate is secured with one portion thereof projecting from the body to expedite and increase the lure action when a line is attached adjacent said inclined face.

A further object is to provide a lure of this character with a diving face at one end thereof and an outwardly downwardly inclined plate at its opposite end, said last named end being provided with a plurality of inclined faces converging adjacent the upper end of said plate to minimize disturbance of the water as the lure passes therethrough.

Other objects will be apparent from the description and the appended claims.

Figure 1:
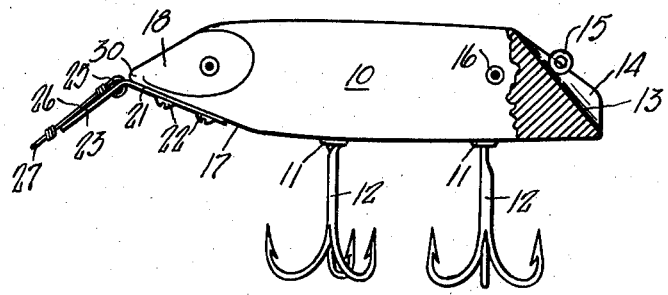
Figure 1 is a side view of the fishing lure, with part thereof shown in section.
Figure 2:
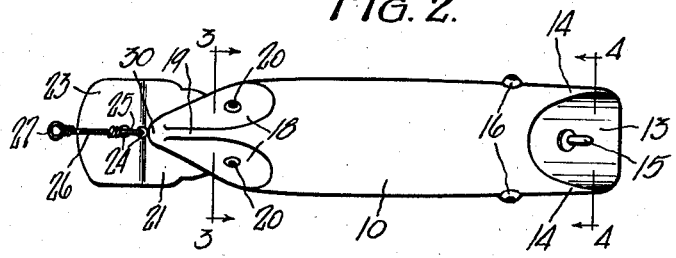
Figure 2 is a top plan view of the lure.

Referring to the drawing, which illustrates the preferred embodiment of the invention, the numeral 10 designates a conventional elongated substantially cylindrical lure body of so-called "cigar" shape formed of wood or other suitable material and preferably of a comparatively low specific gravity whereby the same will normally float upon the water. At the under side of the body 10 in spaced relation and spaced from the ends of the body are a pair of mountings 11 for conventional fish hooks 12, the latter being illustrated as of the triple hook type, and the mounting 11 preferably accommodating swinging or pivotal movement of the hooks relative to the body.

Figure 4:
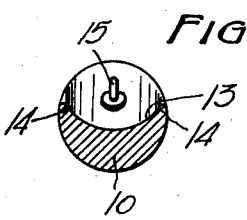
Figure 4 is a transverse sectional view of the lure taken on line 4—4 of Figure 2.

One end of the body is provided with a diving face formed therein, said face preferably being in the form of a cylindrical groove 13 whose axis is inclined to the axis of the lure body but lies in the same vertical plane as the body axis. This groove provides complementary peripheral lips 14 at opposite sides thereof and projecting outwardly longitudinally of said diving face. A suitable eyelet 15 or other suitable line attaching means is secured to said body substantially centrally of said diving face, though preferably slightly above the axis of the lure body, as best illustrated in Figs. 1 and 4. Eyes 16 may be secured to the lure body on opposite sides thereof and preferably rearwardly of lips 14.

Figure 3:
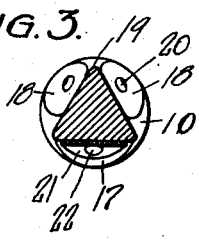
Figure 3 is a transverse sectional view of the lure taken on line 3—3 of Figure 2.

The opposite end of the lure body is provided with a longitudinally outwardly upwardly inclined face 17 at its under side, said face being substantially plane. At its upper side the lure body is provided with a pair of complementary substantially plane faces 18 which are longitudinally outwardly inclined relative to the axis of the lure body, and which are angular to each other and to face 17. The faces 17 and 18 provide the body with a tapered end portion of substantially triangular section, as best illustrated in Fig. 3, to provide a longitudinal inclined ridge 19 at the upper side of said end portion and a substantially pointed end 30. Eyes 20 may be secured to the body substantially centrally of each face 18.

A plate 21 is secured in flat face engagement with the face 17 of the lure body, as by screws 22, and extends outwardly upwardly therefrom. At a point slightly forwardly of the lure body and substantially in alignment longitudinally with the tip 30 of the lure body, the plate 21 is bent downwardly and at an angle to the axis of the lure body to provide a deflecting or diving portion 23. Adjacent the bend in plate portion 23 are provided a pair of longitudinally spaced apertures 24 through which one circularly bent end 25 of a wire line attaching member 26 passes, the other end of said member 26 being looped at 27 for the attachment of a line thereto.

The lure may be attached to a line at either of its ends. When the lure is attached to a line at loop 27 of line attaching member 26, and is then drawn through the water, the resistance of the diving portion 23 of the plate 21 to the water causes the forward end of the lure to be depressed whereby it assumes an inclined or diving position in much the usual manner of a diving lure. It will be noted, however, that the movement of the lure will be altered from that of conventional plug lures equipped with diving plates by the action of the water on lips 14 of the then rear end of the bait. Thus, as eddy currents are created in the water by the passage of the lure therethrough, the same will act upon the lips 14 to produce a lateral shifting or whipping of the rear end of the lure body. In this way the lure is caused to rapidly oscillate from side to side at its rear end, as well as to dive. It will also be seen that the depth to which the lure will dive, and the extent of the lateral oscillation, will depend in part upon the construction per se, but may also be partially controlled by the angler by variations of the speed at which he draws the lure through the water.

An entirely different lure action is obtained when the line is attached to the eyelet 15. Movement of the lure through the water is then influenced by the direct action of the water on the inclined grooved face 13 which results in a diving movement having a coincident lateral darting component produced by the action of the water on lips 14. This lateral darting movement is different from the lateral oscillating movement which has been above described with reference to the other line attachment in that it involves a change of the direction of movement of the lure rather than a whipping or oscillation of the rear end of the lure. This movement of the lure produced by the action of the water on groove 13 is modified by the action of the water on portion 23 of the plate 21; the water striking the under side of said plate portion 23 serving to relatively elevate or raise the rear end of the lure and hence enhance the diving motion by increasing the angle of inclination of the lure body and providing for quick and deep diving of the lure, even when slowly drawn through the water. In other words, in this as in the other line attachment, the movement of the lure in the water is the result of the action of the water on both ends of the lure. It will also be observed that the tapered end portion provided by faces 17 and 18 minimizes the tendency of the lure to create a disturbance in the water as it passes therethrough.

While the construction hereinbefore illustrated and described is preferred, it will be obvious that the invention is capable of embodiment in a lure whose parts have other specific structures and shapes than those shown and described, in which embodiments the same or similar action of the lure is the result of the combined or co-acting reactions of the water on the two ends of the lure.

It will be seen that the lure can be used for deep trolling, even while being slowly drawn through the water, with an action characterized by lateral darting, by attachment of a line to eyelet 15; and for comparatively shallow fishing with a comparatively slow diving and a water disturbing movement when the line is attached to the member 26; so that the single lure can be used for two entirely different types and conditions of fishing by mere selection of the point of line attachment.

We claim:

1. A fishing lure comprising a plug-type body, one end of said body having a longitudinally inclined groove of arcuate section formed therein to provide lips at opposite sides thereof, the other end of said body having a tapered shape defined by an upwardly inclined lower face and a pair of relatively angular downwardly inclined upper faces, a plate secured to said lower face and bent angularly downwardly to provide a deflecting portion projecting longitudinally of said body, and line attaching means at each end of said body.

2. A fishing lure comprising a plug-type body, one end of said body having a longitudinally inclined groove of arcuate section formed therein to provide lips at opposite sides thereof, the other end of said body being tapered and including an upwardly inclined lower end face, a plate secured to said face and projecting longitudinally from said body, the projecting portion of said plate being angularly downwardly bent, and line attaching means at each end of said body.

3. A fishing lure comprising a plug-type body, one end of said body having a longitudinally inclined groove of arcuate section formed therein to provide lips at opposite sides thereof, the other end of said body being substantially tapered, a plate carried by said body at said tapered end and projecting longitudinally angularly downwardly therefrom, and line attaching means at each end of said body, said lure being subjected to the combined action of said groove and said plate when drawn in the water from either end.

4. A fishing lure comprising a plug-type body, one end of said body having a longitudinally inclined groove of arcuate section formed therein, line attaching means carried by said body at said end, a plate carried by the other end of said body and projecting longitudinally downwardly therefrom, movement of said lure through the water tending to lower the grooved end thereof and to relatively raise the other end thereof to provide a quick deep diving action of the lure.

5. The combination with a diving and darting bait having a diving and darting channel in its forward end and inclining downwardly and forwardly and forming upwardly extending flanges at the sides of the forward end of the bait body, of means for increasing the diving action of the bait, said means comprising a downwardly and rearwardly extending flat water resisting member extending downwardly and rearwardly from the extreme rear end of the bait body.

6. A device as set forth in claim 5 wherein the upwardly extending flanges at the sides of the forward end of the bait body and the flat water resisting member are within the lines of the bait body, at their respective ends.

7. A device as set forth in claim 5 wherein the flat water resisting member extends downwardly from the axis of the bait body at the rear end thereof.

8. A device as set forth in claim 5 wherein the flat water resisting member is carried by an upwardly and rearwardly extending flat plate carried by the rear end of the bait body and merging into the flat plate at the axis of the bait body.

9. A quick diving plug-type bait comprising an elongated body member, the forward end of said body member having a downwardly and forwardly extending water resisting channel forming upwardly extending flanges at the sides of the forward end of the body for causing said body to dive and dart as it is drawn through the water and means for rapidly tilting upwardly the rear end of the body, said last named means comprising a downwardly and rearwardly extending flat plate transversely disposed and carried by the rear end of the body.

V. WILLIAM LEUSCH.
HEYWARD P. GIBSON.